(12) United States Patent
Chen

(10) Patent No.: US 7,886,484 B1
(45) Date of Patent: Feb. 15, 2011

(54) PLANT POT

(76) Inventor: Robert Chen, Room 19, No. 5-3B, Sec. 5, Sinyi Rd., Taipei (TW)

( * ) Notice: Subject to any disclaimer, the term of this patent is extended or adjusted under 35 U.S.C. 154(b) by 0 days.

(21) Appl. No.: 12/727,330

(22) Filed: Mar. 19, 2010

(51) Int. Cl.
A01G 9/02 (2006.01)
B65D 8/08 (2006.01)

(52) U.S. Cl. .................. 47/65.5; 220/640; 220/643

(58) Field of Classification Search ............ 47/65.5, 47/75, 66.1; 220/324, 315, 802, 801, 796, 220/659, 657, 656, 640, 643, 642; 119/61.5
See application file for complete search history.

(56) References Cited

U.S. PATENT DOCUMENTS

| | | | | |
|---|---|---|---|---|
| 2,774,509 A | * | 12/1956 | Knobloch | 220/655 |
| 2,790,269 A | * | 4/1957 | Coleman, Jr. | 47/70 |
| 3,622,037 A | * | 11/1971 | Gildart | 220/643 |
| 4,576,330 A | * | 3/1986 | Schepp | 220/315 |
| 6,360,484 B1 | * | 3/2002 | Kreizel | 47/65.5 |
| 6,823,624 B2 | * | 11/2004 | Proserpio | 47/65.5 |
| 2008/0271370 A1 | * | 11/2008 | Moskowitz | 47/66.1 |

* cited by examiner

Primary Examiner—Rob Swiatek
Assistant Examiner—Kristen C Hayes
(74) Attorney, Agent, or Firm—patenttm.us

(57) ABSTRACT

A plant pot has a container and a ring cover. The container has a top, a sidewall and multiple fixing posts. The sidewall has an annular collar. Each fixing post protrudes out from the collar. The ring cover is mounted over the collar of the sidewall of the container and has an inner edge, an outer edge and multiple fixing barrels. The inner edge and the outer edge are attached to the sidewall of the container. Each fixing barrel is formed on and protrudes out from the inner surface of the ring cover and has a corresponding fixing post. Engagement of the fixing posts to the fixing barrels prevents the ring cover from being rotated relative to and detached from the container.

9 Claims, 8 Drawing Sheets

PLANT POT

BACKGROUND OF THE INVENTION

1. Field of the Invention

The present invention relates to a container for growing plants, particularly to a plant pot having an enhanced decorative rim structure.

2. Description of the Prior Arts

Plant pots are containers for culturing plants. For decorative purposes, a decorative rim structure mounted on a top edge of a body of the plant pot has been designed. To increase strength of the decorative rim structure to support a weight of the plant pot during transposition, the decorative rim structure is designed to be solid, not hollow. However, the decorative rim structure and the body of the plant pot have different contraction rates during manufacture by injection molding resulting in consuming time and decreasing the yield. Due to limitations of injection molding and differing contraction times, another conventional plant pot with decorative rim structure is designed.

The conventional plant pot, as shown in FIGS. 5 and 6, has a decorative rim structure (30) formed on a top edge of a sidewall of the plant pot and has a collar (31) and a ring cover (32). The collar (31) is annular and extends out from a top of the sidewall. The ring cover (32) is annular, is mounted on the collar (31) and has two edges and a concavity. The two edges of the ring cover (32) are attached to the collar (31). The concavity is formed together with the collar (31) to define a space. Because the top of the ring cover (32) is separated from the collar (31) without any supporting structure, the decorative rim structure (30) is fragile. Furthermore, the ring cover (32) is easily rotated and detached from the collar (31). Further, in both convention plant pot structures described, forming multiple projections on the decorative rim structure or the collar (31) of the decorative rim structure (30) to increase diversity is labor-intensive and time-consuming so is relatively expensive.

A further conventional plant pot, as shown in FIGS. 7 and 8, is provided with a decorative structure (40) formed on a top edge of a sidewall of the plant pot. The decorative structure (40) includes an annular flange (50), multiple panels (51) and a ring collar (60). The flange (50) extends out from the top of the sidewall and includes a lower end, an outer edge and a slot (52). The panels (51) are formed radially in the flange (50) and are spaced at intervals and each panel (51) props open the lower end of the flange (50). The slot (52) is formed between the panels (51) and the outer edge of the flange (50). The ring collar (60) is mounted around the sidewall, is attached to the flange (50) and has a top edge and a lower edge. The top edge is mounted in the slot (52) of the flange (50). The lower edge is attached to the sidewall of the plant pot. Although the panels (51) strengthen the decorative structure (40), this design complicates manufacturing procedures of the conventional plant pot with the decorative rim structure (40) and also increases a rate of defects. Moreover, as the decorative rim structures of the conventional plant pots as described above, the ring collar (60) is still easily rotated around and detached from the flange (50). Furthermore, since the ring collar (60) is attached to and underside of the flange (50), decoration must be formed on the flange (50).

To overcome the shortcomings, the present invention provides a plant pot to mitigate or obviate the aforementioned problems.

SUMMARY OF THE INVENTION

The main objective of the present invention is to provide a plant pot with a robust rim structure and simple assembly.

A plant pot in accordance with the present invention has a container and a ring cover. The container is a hollow cylinder and has a top, a bottom, a sidewall and multiple fixing posts. The sidewall extends from a top to a bottom of the container, defining a chamber and has a collar and a base section. The base section has an upper edge. The collar is annular, is attached to the upper edge of the base section of the container and has a periphery and an interior edge. Each fixing post is formed on and protrudes out from the collar, preferably away from the bottom of the container. The ring cover is annular, is mounted over the collar of the sidewall of the container and has an inner edge, an outer edge, an inner surface and multiple fixing barrels. The inner edge is attached to the sidewall and defines an opening, formed centrally in the ring cover and communicating with the chamber of the container. The outer edge is attached to the sidewall of the container. The inner surface extends from the inner edge to the outer edge and is opposite to the collar of the sidewall of the container. Each fixing barrel is formed on and protrudes out from the inner surface, corresponds to one of the fixing posts and has a hole corresponding to and accommodating the corresponding fixing post of the container.

Based on a structure of the plant pot as described above, the fixing posts and corresponding fixing barrels enhance strength of the collar of the container in combination with the ring cover. Thus, height between the collar and the ring cover can be increased so increasing durability of the plant pot. Moreover, the ring cover is held firmly on the collar by engagement of the fixing posts and fixing barrels, which prevents the ring cover from being rotated and detached from the container. Furthermore, the fixing posts protrude out from the collar away from the bottom of the container, which corresponds to flow direction of filling material during injection molding so a defect rate of manufacture is also minimized. Therefore, yields of plant pots in accordance with the present invention are increased.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
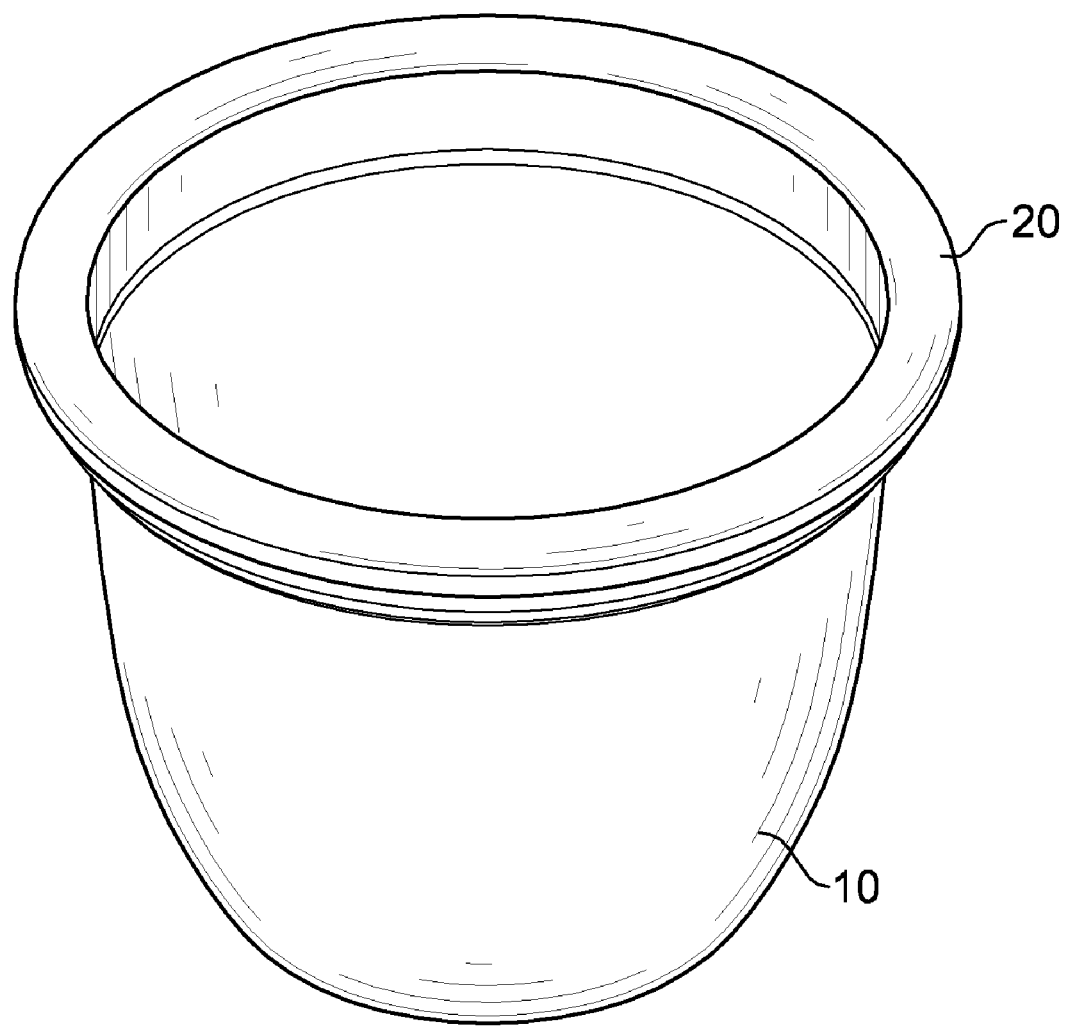
FIG. 1 is a perspective view of a plant pot in accordance with the present invention.

A plant pot in accordance with the present invention, as shown in FIG. 1, comprises a container (10) and a ring cover (20).

Figure 2:
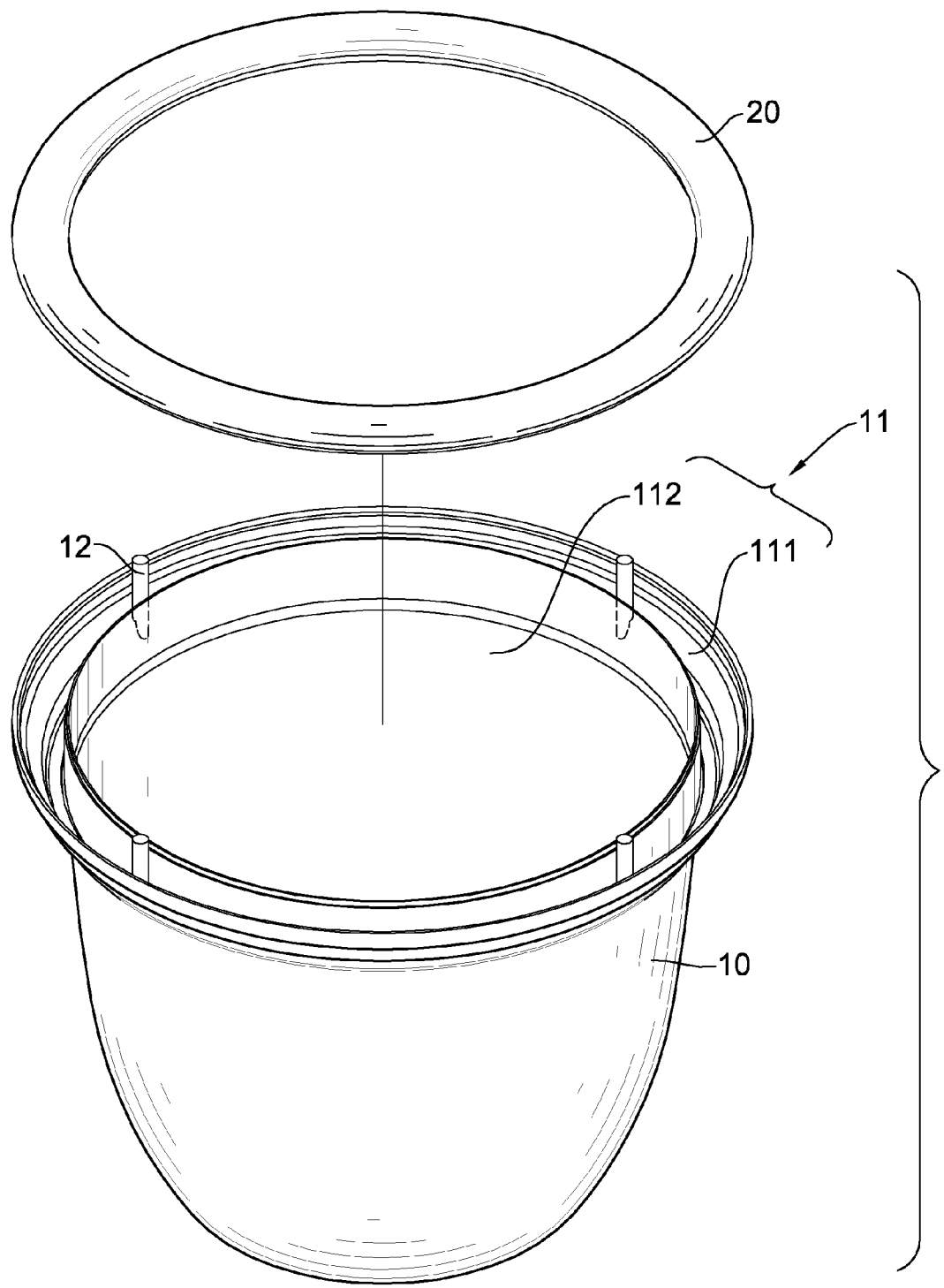
FIG. 2 is an exploded perspective view of the plant pot in FIG. 1.
Figure 3:
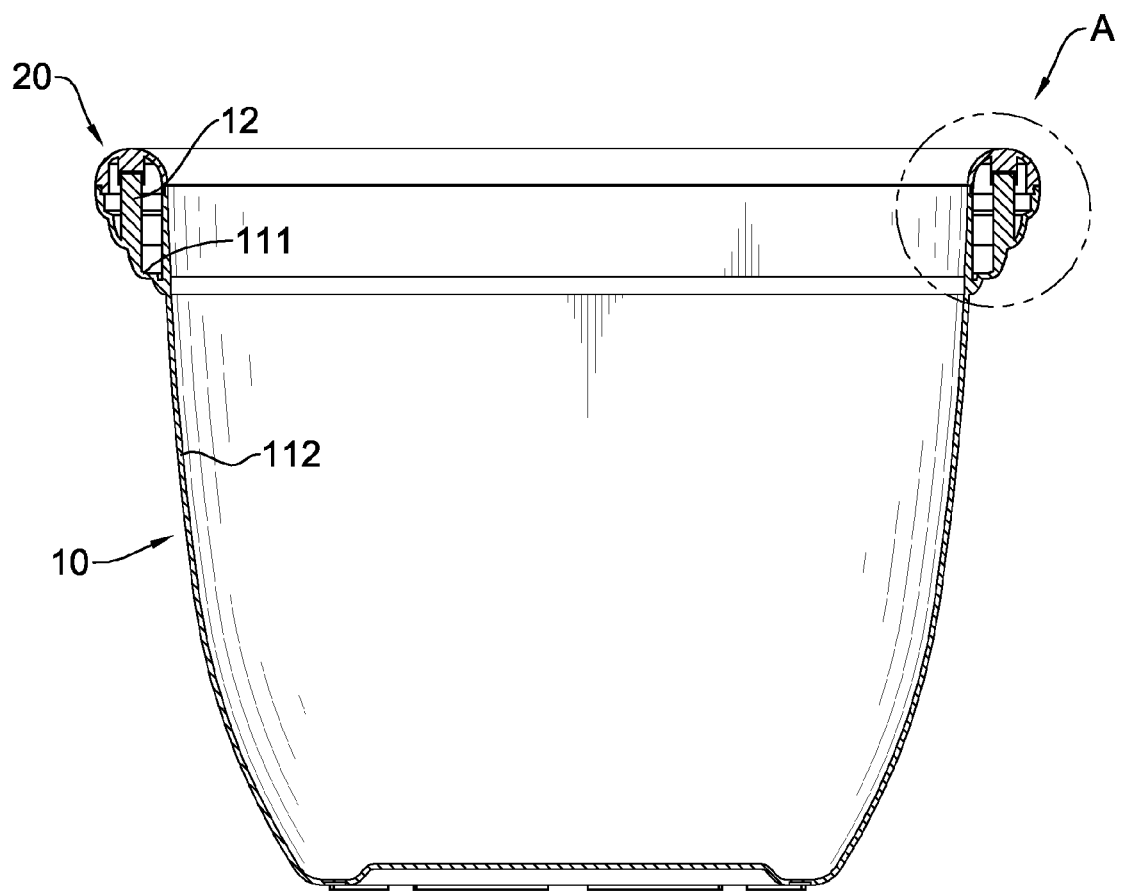
FIG. 3 is a side view of the plant pot in FIG. 1 in cross-section.
Figure 4:
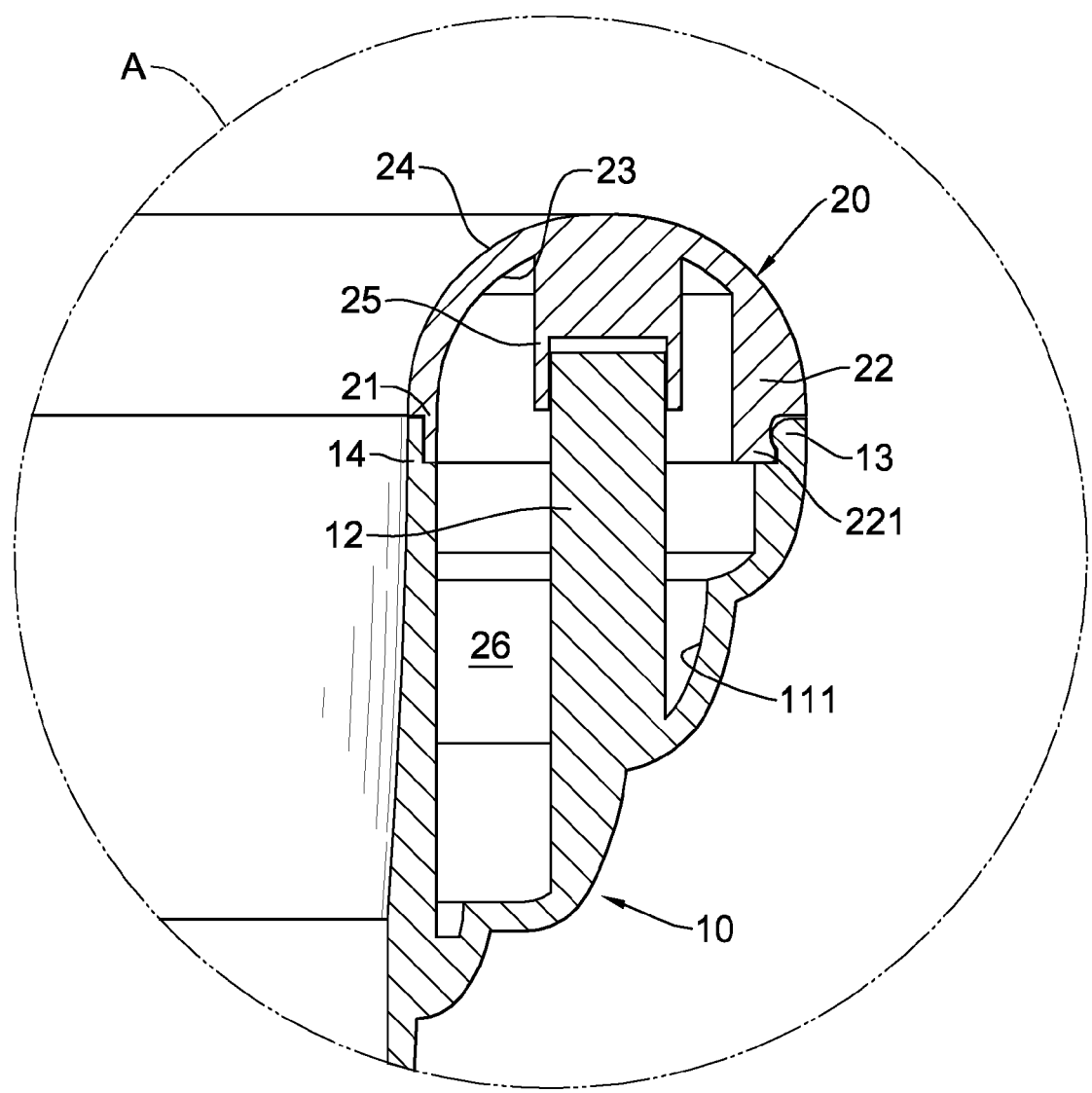
FIG. 4 is a partial, enlarged side view of the plant pot in cross-section, showing section A in FIG. 3.
Figure 5:
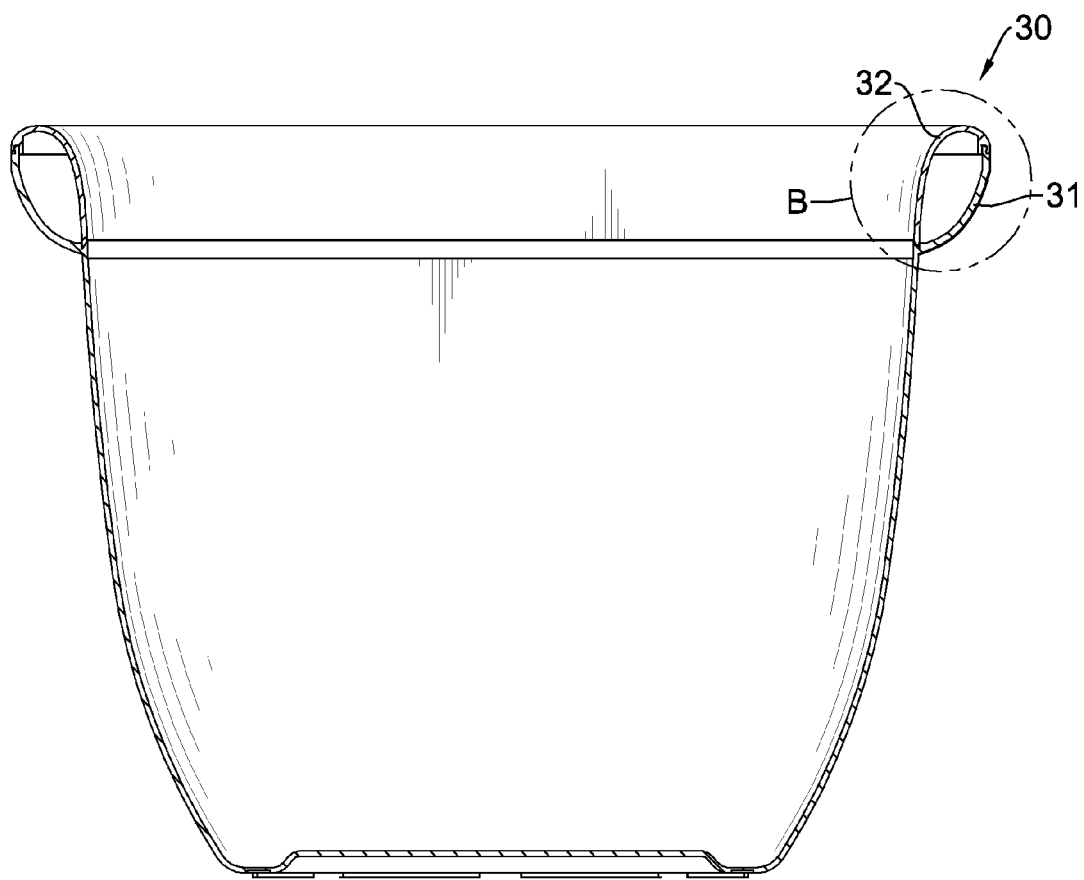
FIG. 5 is a side view of a conventional plant pot in accordance with prior art.
Figure 6:
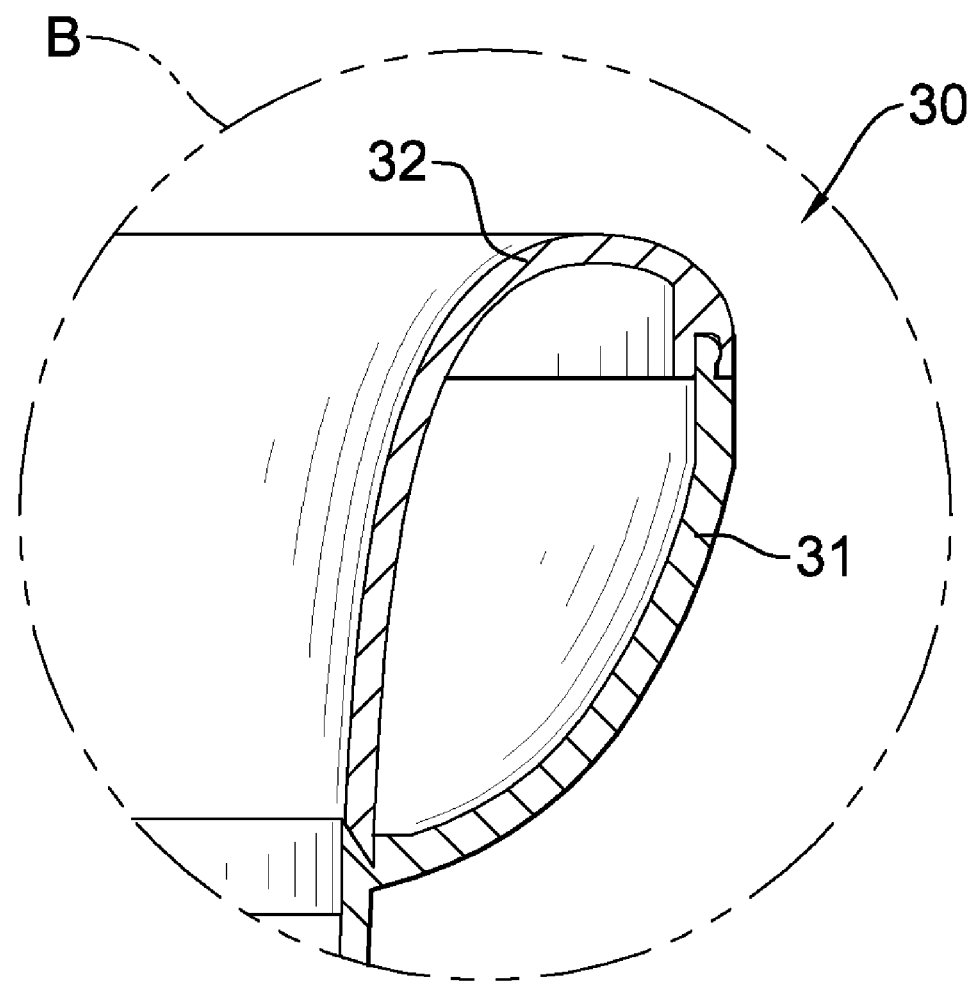
FIG. 6 is a partial enlarged side view of the conventional plant pot in FIG. 5 in cross-section showing section B in FIG. 5.
Figure 7:
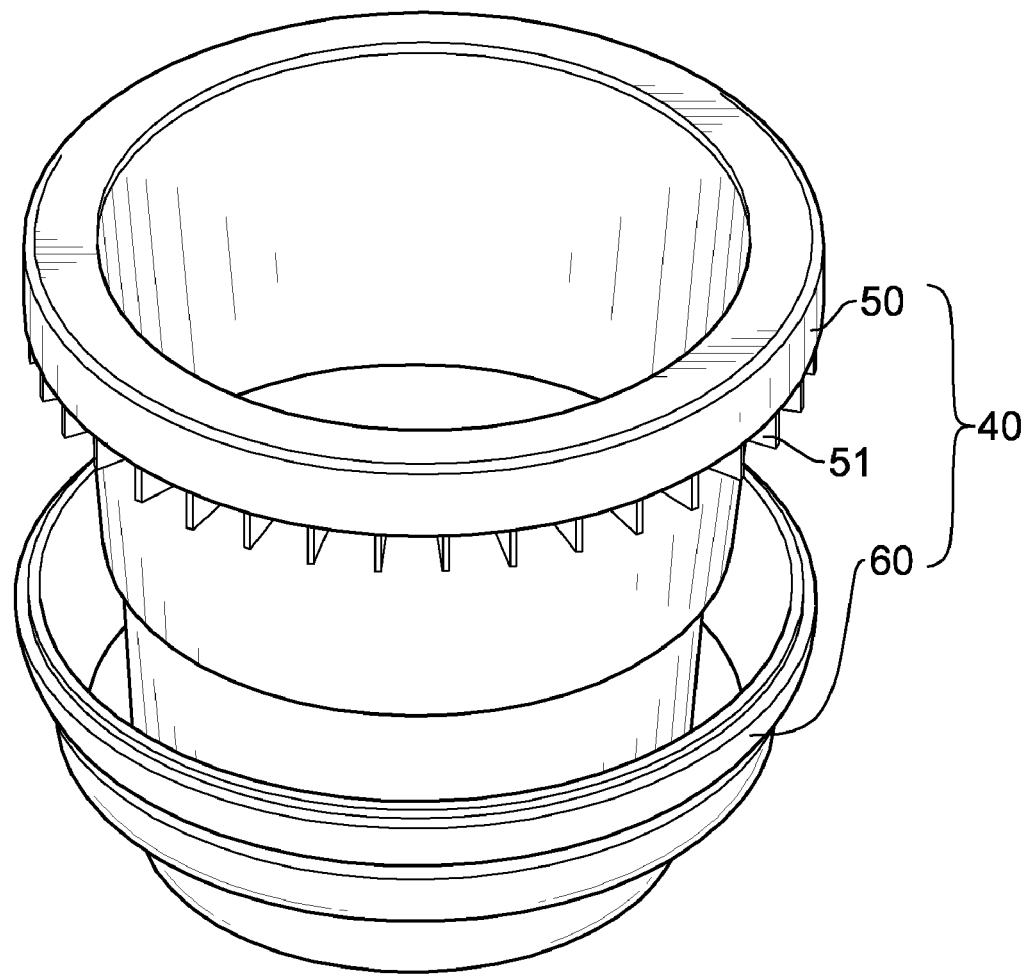
FIG. 7 is an exploded perspective view of another conventional plant pot in accordance with prior art.
Figure 8:
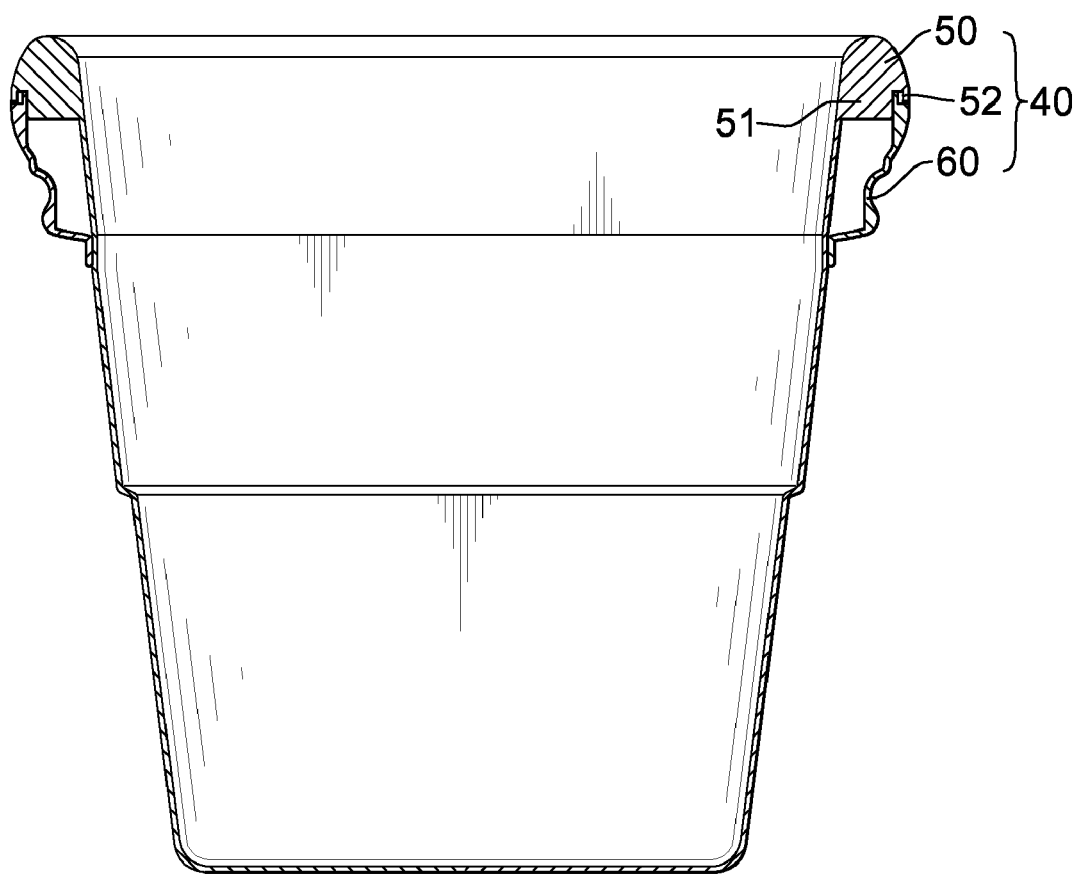
FIG. 8 is a side view of the conventional plant pot in FIG. 7.

The container (10), with further reference to FIGS. 2 and 3, is a hollow cylinder and has a top, a bottom, a sidewall (11), multiple fixing posts (12), an optional outer protrusion (13) and an optional inner protrusion (14). The sidewall (11) defines a chamber and has a collar (111) and a base section (112). As shown in FIG. 4, the collar (111) is annular, is attached to an upper edge of the base section (112) and has a periphery, an interior edge and multiple optional concave segments. The concave segments are annular and formed stepwise between the periphery and the interior edge of the collar (111). The fixing posts (12) are formed on and protrude out from the collar (111) away the bottom the container (10). The outer protrusion (13) is formed on the periphery of the collar (111). The inner protrusion (14) is formed on the interior edge of the collar (111). Preferably, the outer protrusion (13) and the inner protrusion (14) are located at the same height to the bottom of the container.

With reference to FIG. 4, the ring cover (20) is annular, is mounted over the collar (111) of the sidewall (11) of the container (10), in combination with the collar (111) defines a space (26), and has an inner edge (21), an outer edge (22), an inner surface (23), an outer surface (24), multiple fixing barrels (25) and an optional clasp (221). The inner edge (21) is attached to the interior edge of collar (111) of the sidewall (11) of the container (10). The inner edge (21) corresponds to and engages the inner protrusion (14) of the container (10). The outer edge (22) is attached to the periphery of the collar (111) of the sidewall (11) of the container (10). The clasp (221) protrudes out from the outer edge (22) and engages the outer protrusion (13) of the container (10). The inner surface (23) extends from the outer edge (22) to the inner edge (23) of the ring cover (20). The fixing barrels (25) are formed on and protrude out the inner surface (23). Each fixing barrel (25) corresponds to and is mounted around a corresponding fixing post (12) of the container (10).

As described above, engagement of the fixing posts (12) and the corresponding fixing barrels (25) can greatly enhance strength of the structure formed by the collar (111) and the ring cover (20). The ring cover (20) is steadily mounted on the collar (111) by mounting the fixing posts (12) in the fixing barrels (25).

Therefore, height between the collar (111) and the ring cover (20) can be increased. Moreover, the ring cover (20) is not easily rotated around and detached from the container (10). Furthermore, the fixing posts (12) protrude out from the collar (111) from the bottom of the container (10), which is consistent with flow direction of filling material during injection molding for manufacturing a plant pot so manufacturing yields of plant pots in accordance with the present invention are increased.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An open top plant pot comprising
   a container formed as a hollow cylinder and having
      a top;
      a bottom;
      a sidewall extending from the top to the bottom of the container, defining a chamber and having
         a base section having an upper edge; and
         an annular collar, attached to the upper edge of the base section, and having
            a periphery; and
            an interior edge; and
      multiple fixing posts formed on and protruding out from the collar;
   a ring cover mounted over the collar of the sidewall of the container and having
      an inner circumferential edge attached to the interior edge of the collar of the sidewall of the container; and
      an outer circumferential edge attached to the periphery of the collar of the sidewall of the container; and
      an inner surface extending from the inner edge to the outer edge and in combination with the collar to define a space; and
      multiple fixing barrels formed on and protruding out the inner surface, each fixing barrel corresponding to and mounted around one of the fixing posts.

2. The plant pot of the claim 1, wherein
   the container further comprises an outer protrusion formed on the periphery of the collar, and
   the outer edge of the ring cover engages the outer protrusion of the container.

3. The plant pot of the claim 2, wherein
   the container further comprises an inner protrusion formed on the interior edge of the collar, and
   the inner edge of the ring cover corresponds to and engages the inner protrusion of the container.

4. The plant pot of the claim 3, wherein the ring cover has a clasp protruding out from the outer edges and engaging the outer protrusion of the container.

5. The plant pot of the claim 3, wherein
   the collar further has multiple concave segments formed stepwise between the periphery and the interior edge of the collar.

6. The plant pot of the claim 2, wherein the ring cover has a clasp protruding out from the outer edges and engaging the outer protrusion of the container.

7. The plant pot of the claim 6, wherein the collar further has multiple concave segments formed stepwise between the periphery and the interior edge of the collar.

8. The plant pot of the claim 2, wherein
   the collar further has multiple concave segments formed stepwise between the periphery and the interior edge of the collar.

9. The plant pot of the claim 1, wherein
   the collar further has multiple concave segments formed stepwise between the periphery and the interior edge of the collar.

* * * * *